US012708810B2

(12) United States Patent
Wang et al.

(10) Patent No.: US 12,708,810 B2
(45) Date of Patent: Aug. 18, 2026

(54) PULSED LOW-ALTITUDE AND HIGH-SPRAY TANK FIRE TRUCK AND SPRAY METHOD THEREOF

(71) Applicant: HEBEI FEIPU ENVIRONMENTAL PROTECTION TECH CO., LTD., Shijiazhuang (CN)

(72) Inventors: Zhenbiao Wang, Shijiazhuang (CN); Hu Liu, Shijiazhuang (CN)

(73) Assignee: HEBEI FEIPU ENVIRONMENTAL PROTECTION TECH CO., LTD., Shijiazhuang (CN)

( * ) Notice: Subject to any disclaimer, the term of this patent is extended or adjusted under 35 U.S.C. 154(b) by 259 days.

(21) Appl. No.: 18/529,518

(22) Filed: Dec. 5, 2023

(65) Prior Publication Data

US 2024/0226623 A1 Jul. 11, 2024

(30) Foreign Application Priority Data

Jan. 7, 2023 (CN) ......................... 202310020634.2

(51) Int. Cl.
*A62C 31/00* (2006.01)

(52) U.S. Cl.
CPC .................................... *A62C 31/00* (2013.01)

(58) Field of Classification Search
CPC . A62C 31/00; A62C 31/005; A62C 31/02–07; A62C 31/12; A62C 27/00; A62C 99/0018; A62C 99/0027; A62C 99/0036; A62C 99/0072; A62C 35/023; A62C 13/66; A62C 13/02–22;
(Continued)

(56) References Cited

U.S. PATENT DOCUMENTS 2,799,352 A * 7/1957 Boerner ................. A62C 5/002 137/893
2002/0083736 A1* 7/2002 Kotliar ...................... F17C 7/04 169/5
2012/0168184 A1* 7/2012 Enk, Sr. ................... A62C 5/02 169/14

FOREIGN PATENT DOCUMENTS

CN 106978996 A 7/2017
CN 206880993 U 1/2018
CN 212943569 U 4/2021

OTHER PUBLICATIONS

Office Action issued by the National Intellectual Property Administration of the People's Republic of China in Application No. 202310020634.2 issued May 18, 2023. 20 pages.

* cited by examiner

*Primary Examiner* — Steven M Sutherland
(74) *Attorney, Agent, or Firm* — Nelson Mullins Riley & Scarborough LLP; Anthony A. Laurentano

(57) ABSTRACT

A pulsed low-altitude and high-spray tank fire truck and a spray method thereof are provided. A liquid working medium is stored in the liquid working medium storage tank. A phase change enabler is configured to heat the liquid working medium such that the liquid working medium changes from a liquid phase into a gas phase and to pressurize the gasified working medium and send it into an energy storage gas tank. The first and second pressure-resistant water tanks work alternately. The first and second electric control water cannons are configured to spray a high-pressure liquid fire extinguishing agent to a position of a fire point at a specified height. The system control module is configured to realize automatic inflating of the first and second pressure-resistant water tanks and automatic spray
(Continued)

operation of the first and second electric control water cannons.

9 Claims, 2 Drawing Sheets

(58) Field of Classification Search
CPC ... A62C 13/68–72; A62C 13/76; A62C 5/002; A62C 5/008
See application file for complete search history.

PULSED LOW-ALTITUDE AND HIGH-SPRAY TANK FIRE TRUCK AND SPRAY METHOD THEREOF

CROSS-REFERENCE TO RELATED APPLICATION

This patent application claims the benefit and priority of Chinese Patent Application No. 202310020634.2 filed on Jan. 7, 2023, the disclosure of which is incorporated by reference herein in its entirety as part of the present application.

TECHNICAL FIELD

The present disclosure belongs to the technical field of high-rise building fire extinguishing, and in particular to a pulsed low-altitude and high-spray tank fire truck and a spray method thereof.

BACKGROUND

At present, there are many high-rise buildings with a height of over 100 meters in the world. Once a fire breaks out, the fire is disastrous. High-rise fire extinguishing is a worldwide problem, and the construction of high-rise buildings is restricted by a problem of high-rise fire extinguishing. Fixed fire extinguishing facilities in high-rise buildings usually only play a limited role in local fire extinguishing at the beginning of the fire. Once the fire is spread to a large-scale three-dimensional spread state inside and outside the building, the fixed fire extinguishing facilities in the building quickly lose efficacy. In the fire extinguishing measures implemented outside the building, it is necessary to send fire extinguishing materials to high-level fire points quickly and accurately.

Equipment capable of reaching the fire extinguishing conditions of over 100 meters includes fire ladders (lifting operation vehicles), turbojet fire trucks, helicopters, unmanned aerial vehicles, fire extinguishing rockets and the like. The fire extinguishing measures designed based on the equipment are of great defects and limitations in fire extinguishing effectiveness. The defects and limitations are mainly reflected in the following aspects; firstly, ultra-high (at present, the highest fire ladder in the world is 112 meters, and the highest fire ladder in China is 101 meters) fire ladders are high in cost, huge in operation and maintenance cost, high in site requirements, low in safety, small in water jet flow and great in environmental impact, and need large support planes. In many scenes, the ultra-high fire ladders cannot play a role. Serious challenge is involved in on-the-spot command of sudden fire accidents. Secondly, because the jet of the turbojet fire truck is a mixed flow of gas and water or foam mixed solution, the accuracy of reaching a high ignition point of over 100 meters is greatly reduced. The power comes from a large thrust aero-engine, so that the energy consumption is high, and environmental pollution, especially noise pollution, is easily caused. Thirdly, helicopter fire extinguishing needs the weather and the surrounding environment of the fire buildings to be suitable for take-off and flight conditions, and needs fire extinguishing resources that can be easily obtained at close range since limited fire extinguishing materials are carried at one time. At the same time, the fire extinguishing materials are accurately delivered to fire extinguishing points in harsh conditions. In addition, the procurement cost and later maintenance cost of helicopters are high, so that the fire extinguishing method is not an effective measure that can be widely applied. Fourthly, due to the problems of unmanned aerial vehicle load, endurance and environmental electromagnetic interference, unmanned aerial vehicle fire extinguishing is only supplemented for playing a decisive auxiliary role in high-rise fire extinguishing. Fifthly, fire extinguishing rockets can crash through the wall and send the fire extinguishing agent into the building, and the flames of around 80 square meters can be extinguished, but the fire extinguishing rockets have not been popularized and applied because of safety and other reasons.

SUMMARY

The technical problem to be solved by the present disclosure is to provide a pulsed low-altitude and high-spray tank fire truck and a spray method thereof aiming at deficiencies in the prior art, so that long-distance large-flow pulsed liquid spraying and fire extinguishing at a fire point with a height of over 100 meters are realized.

In order to solve the technical problem, the present disclosure provides the following technical solutions.

A pulsed low-altitude and high-spray tank fire truck includes a carrying module for providing maneuverability guarantee, and further includes a liquid working medium storage tank, an energy storage gas tank, a first pressure-resistant water tank, a second pressure-resistant water tank and a system control module which are arranged on the carrying module. A liquid working medium is stored in the liquid working medium storage tank. A liquid outlet of the liquid working medium storage tank is connected with a gas inlet of the energy storage gas tank through a phase change enabler. The phase change enabler is configured to heat the liquid working medium output from the liquid working medium storage tank for being energized such that the liquid working medium changes from a liquid phase into a gas phase and to pressurize the gasified working medium and send it into an energy storage gas tank. A gas outlet of the energy storage gas tank is connected with gas inlets of the first pressure-resistant water tank and the second pressure-resistant water tank through two gas intake branches. The energy storage gas tank is configured to provide a high-pressure gaseous working medium with specified pressure for the first pressure-resistant water tank and the second pressure-resistant water tank filled with a liquid fire extinguishing agent. A first electric control water cannon and a second electric control water cannon are respectively arranged on the first pressure-resistant water tank and the second pressure-resistant water tank. The first pressure-resistant water tank and the second pressure-resistant water tank are used for working alternately. The first electric control water cannon and the second electric control water cannon are respectively configured to spray a high-pressure liquid fire extinguishing agent formed in the first pressure-resistant water tank and the second pressure-resistant water tank to a position of a fire point at a specified height, and the specified height is dependent on the specified pressure. The system control module is configured to realize automatic inflating of the first pressure-resistant water tank and the second pressure-resistant water tank and automatic spray operation of the first electric control water cannon and the second electric control water cannon.

In an embodiment, the pulsed low-altitude and high-spray tank fire truck further includes a low-pressure water tank arranged on the carrying module. The low-pressure water tank is connected with a water source through a water supply pipe. The water source is a water wagon, a watering cart or a fire hydrant. A water pump capable of generating certain pressure is mounted on the water supply pipe. Two water outlets of the low-pressure water tank are respectively connected with water inlets of the first pressure-resistant water tank and the second pressure-resistant water tank through water injection branch pipes. A first liquid injection valve and a second liquid injection valve are respectively mounted on the water injection branch pipes of the first pressure-resistant water tank and the second pressure-resistant water tank.

In an embodiment, a first pressure relief valve and a second pressure relief valve are respectively arranged on the first pressure-resistant water tank and the second pressure-resistant water tank.

In an embodiment, the energy storage gas tank, the first pressure-resistant water tank, the second pressure-resistant water tank and all pipelines are provided with sensors or electric control valves, and all sensors and electric control valves are connected with the system control module to realize automatic control of a system.

In an embodiment, the liquid fire extinguishing agent is water or fire extinguishing foam liquid.

In an embodiment, the working medium is carbon dioxide or nitrogen.

In an embodiment, the first electric control water cannon and the second electric control water cannon are both high-pressure fire cannons.

In an embodiment, the phase change enabler includes a heat exchanger for gasifying an inflated liquid working medium and a heater for providing heat for the heat exchanger; and the liquid outlet of the liquid working medium storage tank is connected with a liquid inlet of the heat exchanger through a liquid inlet pipe, and a gas outlet of the heat exchanger is connected with the gas inlet of the energy storage gas tank through an exhaust pipe.

A spray method of a pulsed low-altitude and high-spray tank fire truck includes following steps;

S1, loading a liquid fire extinguishing agent into a low-pressure water tank, and filling a liquid fire extinguishing agent into a first pressure-resistant water tank and a second pressure-resistant water tank through the low-pressure water tank;

S2, injecting a high-pressure gaseous working medium into an energy storage gas tank by using a phase change enabler;

S3, opening intercommunicating valves on gas intake branches between the energy storage gas tank and the first pressure-resistant water tank and between the energy storage gas tank and the second pressure-resistant water tank, to apply pressure of the energy storage gas tank to liquid in the first pressure-resistant water tank and the second pressure-resistant water tank; and opening spray valves of a first electric control water cannon and a second electric control water cannon, to spray a high-pressure liquid extinguishing agent in the first pressure-resistant water tank and the second pressure-resistant water tank to a position of a fire point at a specified height;

S4, when a spraying of the first pressure-resistant water tank or the second pressure-resistant water tank is nearly completed, closing a intercommunicating valve on a corresponding gas intake branch to reserve gas sealed in the energy storage gas tank for a next spraying; when the spraying of the first pressure-resistant water tank or the second pressure-resistant water tank is completed, closing a corresponding spray valve and opening a pressure relief valve on a corresponding pressure-resistant water tank, to release residual gas in the corresponding pressure-resistant water tank and quickly reduce pressure in the corresponding pressure-resistant water tank to less than pressure of a water source, and opening a liquid injection valve to inject the liquid fire extinguishing agent into the corresponding pressure-resistant water tank;

S5, after the corresponding pressure-resistant water tank is filled with the liquid fire extinguishing agent, closing the pressure relief valve and the liquid injection valve and opening the intercommunicating valve on the corresponding gas inlet branch to inject the high-pressure gaseous working medium, and then starting next spraying again; and S6, enabling the first pressure-resistant water tank and the second pressure-resistant water tank to work alternately to form impulsive long-distance large-water liquid spraying.

The present disclosure has the beneficial effects that the high-rise fire extinguishing equipment can be transported to the ground near fire high-rise buildings, and dozens of tons of liquid fire extinguishing agent can be quickly sprayed directly to the high-rise fire points through high-pressure water spraying. The present disclosure adopts an asynchronous enabling mode, such that high-power spraying and spraying at a height of over 100 meters are realized, realizing fire extinguishing at a fire point at a height of 100 meters.

Gas (carbon dioxide, nitrogen and the like) is taken as a working medium to enable the gas, such that the transformation from a liquid phase to a gas phase is realized, and energy is accumulated, and the process is low in power and long in time. Then, phase change energy and intramolecular energy are rapidly transformed into jet kinetic energy of the liquid fire extinguishing agent, and this process is short in time and high in power, just like a power amplifier, so that energy is accumulated at low power for a long time and released at high power for a short time, which is called asynchronous enabling. This method is different from a conventional real-time energy supply method, which avoids the technical bottleneck of a mechanical pressurization method.

By using an automatic control system, the system design for various processes such as enabling gas injection, pressure relief, liquid injection and spraying is optimized to realize rapid automatic remote control for pulsed spraying.

The present disclosure adopts the asynchronous enabling mode, such that the high-pressure liquid extinguishing agent can be directly and accurately sprayed to a high ignition point of more than 100 meters without the aid of a pipeline, and the spraying power can be as high as over 1000 KW. In addition, the equipment also has the following advantages: the equipment is low in requirements for terrain conditions, environmental conditions and obstacles in combat positions and high in maneuverability, and can be sprayed at low altitude; the equipment can be controlled remotely and is high in field operability; the equipment is low in procurement cost, and because there is no mechanical wear, the later maintenance and consumption costs are very low; and the equipment is firm, high in anti-damage ability, safe and reliable, free of secondary pollution, environmentally-friendly and energy-saving. The equipment makes up for the defects of existing high-rise fire extinguishing equipment, and can realize effective high-rise fire extinguishing.

DETAILED DESCRIPTION OF THE EMBODIMENTS

To facilitate the understanding of the present disclosure, the present disclosure will be further described in detail with reference to the attached drawings and embodiments thereof. It should be clear to those skilled in the art that the embodiments are only helpful for understanding the present disclosure, and should not be regarded as specific limitations of the present disclosure.

Figure 1:
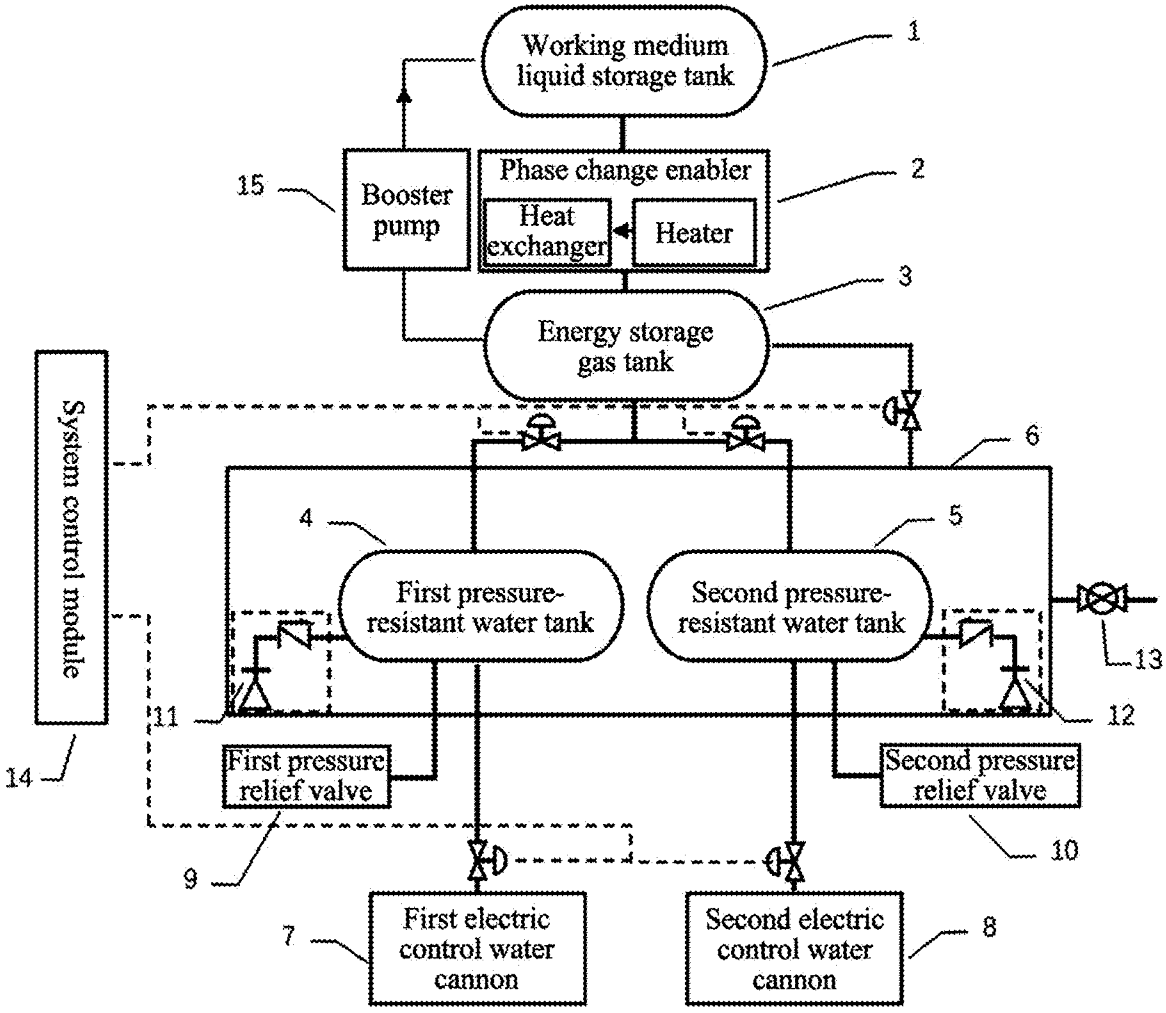
FIG. 1 is a schematic diagram of a structure according to the present disclosure.

As shown in FIG. 1, the present disclosure provides a pulsed low-altitude and high-spray tank fire truck. The pulsed low-altitude and high-spray tank fire truck includes a carrying module for providing maneuverability guarantee, and further includes a liquid working medium storage tank 1, an energy storage gas tank 3, a first pressure-resistant water tank 4, a second pressure-resistant water tank 5, a low-pressure water tank 6 and a system control module 14 which are arranged on the carrying module. A liquid working medium is stored in the liquid working medium storage tank 1, and the working medium is carbon dioxide or nitrogen. A liquid outlet of the liquid working medium storage tank 1 is connected with a gas inlet of the energy storage gas tank 3 through a phase change enabler 2. The phase change enabler 2 is configured to heat the liquid working medium output from the liquid working medium storage tank 1 for being energized such that the liquid working medium changes from a liquid phase into a gas phase, and then to pressurize the gasified working medium and send it into an energy storage gas tank 3. A gas outlet of the energy storage gas tank 3 is connected with gas inlets of the first pressure-resistant water tank 4 and the second pressure-resistant water tank 5 through two gas intake branches. The energy storage gas tank 3 is configured to provide a high-pressure gaseous working medium with specified pressure for the first pressure-resistant water tank 4 and the second pressure-resistant water tank 5 filled with a liquid fire extinguishing agent. The liquid fire extinguishing agent is water or fire extinguishing foam liquid. A first electric control water cannon 7 and a second electric control water cannon 8 are respectively arranged on the first pressure-resistant water tank 4 and the second pressure-resistant water tank 5. The first pressure-resistant water tank 4 and the second pressure-resistant water tank 5 are used for working alternately. The first electric control water cannon 7 and the second electric control water cannon 8 are respectively configured to spray a high-pressure liquid fire extinguishing agent formed in the first pressure-resistant water tank 4 and the second pressure-resistant water tank 5 to a position of a fire point at a specified height, and the specified height is dependent on the specified pressure. The system control module 14 is configured to realize automatic inflating of the first pressure-resistant water tank 4 and the second pressure-resistant water tank 5 and automatic spray operation of the first electric control water cannon 7 and the second electric control water cannon 8. The first electric control water cannon 7 and the second electric control water cannon 8 are both high-pressure fire cannons, which are resistant to high pressure (more than 4 MPa) and large in flow (more than 250) L/S), and can realize two-dimensional rotational control.

In the present disclosure, the term "pulsed" means that the spraying of the high-pressure liquid fire extinguishing agent in the pressure-resistant water tank is pulsed, with an interval of about 1 minute. The term "low-altitude" means that the fire truck is parked on the ground or road. The term "high-spray" means that the spray height is more than 100 meters, and the liquid extinguishing agent can be sprayed to a fire point at a height of 100 meters, so that high-rise fire extinguishing is realized. Large flow refers to the flow of more than 250 L/S or more than 60) cubic meters per hour to meet the needs of high-rise fire extinguishing or forest fire extinguishing, etc. The tank fire truck means that the pressure-resistant water tank and the energy storage gas tank are characteristic structures of the fire truck.

A low-pressure water tank 6 is also arranged on the carrying module. The low-pressure water tank 6 is connected with a water source through a water supply pipe. The water source is a water wagon, a watering cart or a fire hydrant. A water pump 13 capable of generating certain pressure is mounted on the water supply pipe. Two water outlets of the low-pressure water tank 6 are respectively connected with water inlets of the first pressure-resistant water tank 4 and the second pressure-resistant water tank 5 through water injection branch pipes. A first liquid injection valve 11 and a second liquid injection valve 12 are respectively mounted on the water injection branch pipes of the first pressure-resistant water tank 4 and the second pressure-resistant water tank 5. A first pressure relief valve 9 and a second pressure relief valve 10 are respectively arranged on the first pressure-resistant water tank 4 and the second pressure-resistant water tank 5.

The present disclosure adopts two-stage water tanks to inject water so as to solve the difficulty in continuous water injection under high pressure. The first-stage water tank consists of two high-pressure water tanks, namely the first pressure-resistant water tank 4 and the second pressure-resistant water tank 5. Under high pressure, liquid spraying at a height of over 100 meters can be realized. The second-stage water tank is the low-pressure water tank 6.

When the first pressure-resistant water tank 4 and the second pressure-resistant water tank 5 are in a high-pressure state, the first liquid injection valve 11 and the second liquid injection valve 12 are in a closed state. When the spraying of the pressure-resistant water tank is completed, residual gas is released for rapid pressure relief. When the pressure of the pressure-resistant water tank is lower than that of the low-pressure water tank 6, the liquid injection valve is automatically opened, and the liquid in the low-pressure water tank 6 can be quickly injected into the pressure-resistant water tank in a low-pressure state through the liquid injection valve until the pressure-resistant water tank is filled. Then, the liquid spraying process of the pressure-resistant water tank can be started again.

In the whole process, the pressure of the water pump is larger than that of the low-pressure water tank 6 so as to realize continuous liquid injection, ensuring that liquid sprayed by the pressure-resistant water tank is continuously supplied, and dynamic supply balance can be realized through matching the parameters such as pressure and flow rate. Continuous water supply of the low-pressure water tank 6 and pulsed spraying of the pressure-resistant water tank are realized.

The first pressure-resistant water tank 4 and the second pressure-resistant water tank 5 alternately spray water to shorten the interval time of spraying, thus realizing quasi-continuous spraying. A single pressure-resistant water tank is small in water quantity and small in gas consumption, so that second spraying can be realized faster, the cost is lower, and the single pressure-resistant water tank is more suitable for vehicles.

Liquid carbon dioxide or liquid nitrogen is heated and enabled to be changed into a gas phase from a liquid phase, and then the gas is pressurized and sent to the energy storage gas tank 3. By using gas such as carbon dioxide or nitrogen as an energy storage medium, the energy storage gas tank 3 provides high pressure for liquid spraying, and provides energy conversion (intramolecular energy is converted into kinetic energy of liquid spraying).

The phase change enabler 2 includes a heat exchanger for gasifying an inflated liquid working medium and a heater for providing heat for the heat exchanger. The liquid outlet of the liquid working medium storage tank 1 is connected with a liquid inlet of the heat exchanger through a liquid inlet pipe, and a gas outlet of the heat exchanger is connected with the gas inlet of the energy storage gas tank 3 through an exhaust pipe.

The phase change enabler 2 is high in power, so that the spray frequency can be improved. The liquid carbon dioxide or liquid nitrogen is heated for being energized such that the liquid carbon dioxide or liquid nitrogen changes from a liquid phase into a gas phase, and then to pressurize the gasified carbon dioxide or gasified nitrogen and send it to the energy storage gas tank 3. The liquid carbon dioxide or liquid nitrogen is output from the liquid working medium storage tank 1 and gasified through the heat exchanger. Energy of the overheated liquid output from the heat source is transferred in the heat exchanger to enable the liquid carbon dioxide or liquid nitrogen to be gasified. The gasified working medium is filled into the energy storage gas tank 3, and the pressure of the energy storage gas tank 3 is raised to a design value. In order to ensure smooth discharge of the liquid working medium storage tank 1, a booster pump 15 is used for pressurizing the liquid working medium storage tank 1.

The energy storage gas tank 3, the first pressure-resistant water tank 4, the second pressure-resistant water tank 5 and all pipelines are provided with sensors or electric control valves, and all sensors and electric control valves are connected with the system control module 14 to realize automatic control of the system.

The spray height is controlled by controlling the setting of spray pressure, and the gas supply speed is controlled by the power of phase change enabler 2, thereby controlling the pulse frequency of spraying. Through multi-point data acquisition of pressure, temperature, liquid level, etc, the opening and closing control for valves is optimized, and the pulse frequency is improved. Gas supply, water supply, water spraying, fire extinguishing height, aiming etc, are matched and optimized by the system control module 14.

The carrying module is provided with a dynamic load-bearing chassis, which promotes the maneuverability of the complete equipment and an electric support platform.

Figure 2:
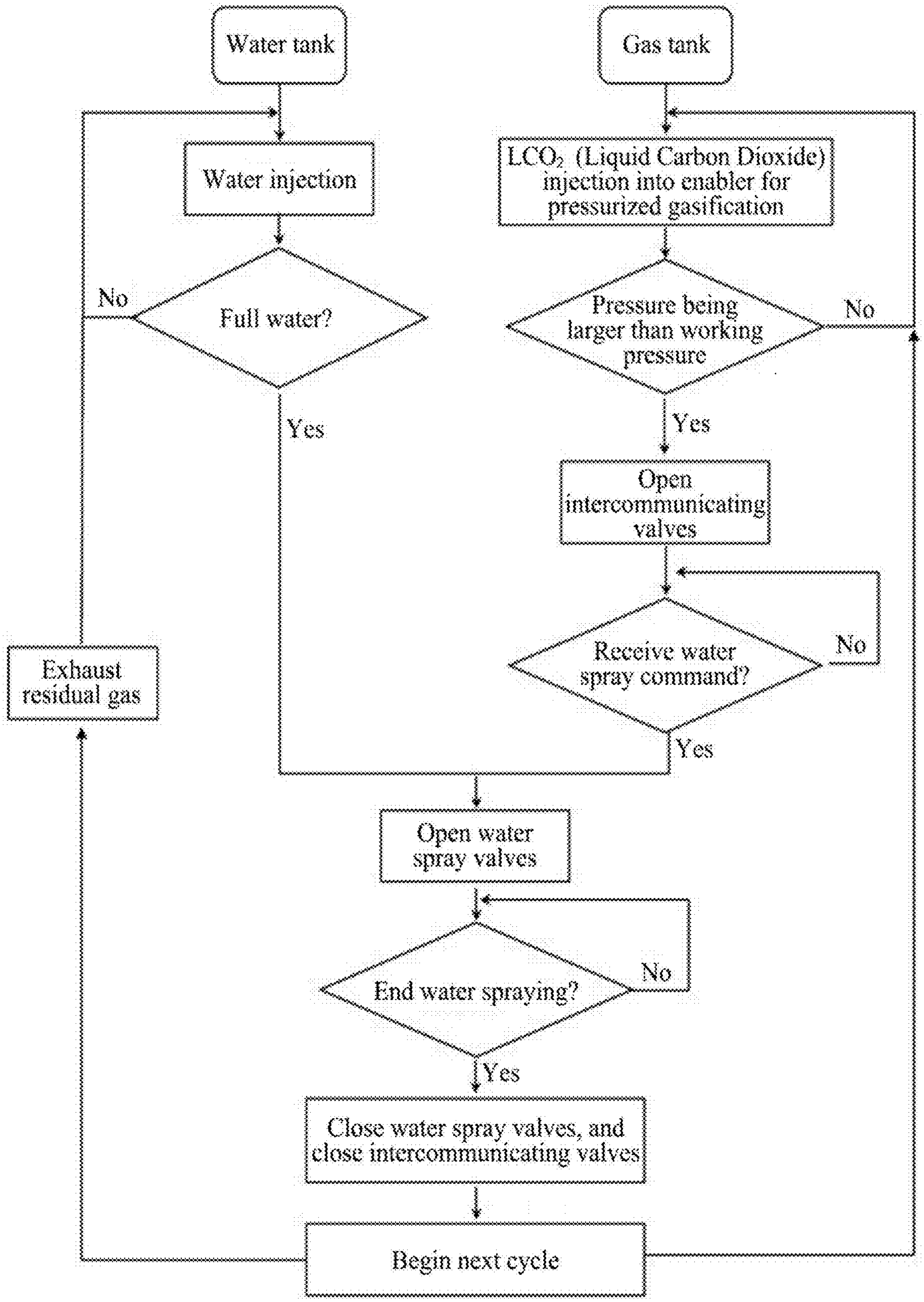
FIG. 2 is a control flow chart of a system according to the present disclosure.

As shown in FIG. 2, the present disclosure also provides a spray method of the pulsed low-altitude and high-spray tank fire truck, including steps S1-S6.

In step S1, a liquid fire extinguishing agent is loaded into a low-pressure water tank 6, and the liquid fire extinguishing agent is filled into a first pressure-resistant water tank 4 and a second pressure-resistant water tank 5 through the low-pressure water tank 6.

In step S2, a high-pressure gaseous working medium is injected into an energy storage gas tank 3 by using a phase change enabler 2.

In step S3, intercommunicating valves on gas intake branches between the energy storage gas tank 3 and the first pressure-resistant water tank 4 and between the energy storage gas tank 3 and the second pressure-resistant water tank 5 are opened, to apply pressure of the energy storage gas tank 3 to liquid in the first pressure-resistant water tank 4 and the second pressure-resistant water tank 5; and spray valves of a first electric control water cannon 7 and a second electric control water cannon 8 are opened, to spray a high-pressure liquid extinguishing agent in the first pressure-resistant water tank 4 and the second pressure-resistant water tank 5 to a position of a fire point at a specified height.

In step S4, when a spraying of the first pressure-resistant water tank 4 or the second pressure-resistant water tank 5 is nearly completed, a intercommunicating valve on a corresponding gas intake branch is closed to reserve gas sealed in the energy storage gas tank 3 for a next spraying; when the spraying of the first pressure-resistant water tank 4 or the second pressure-resistant water tank 5 is completed, a corresponding spray valve is closed and a pressure relief valve on a corresponding pressure-resistant water tank is opened, to release residual gas in the corresponding pressure-resistant water tank and quickly reduce pressure in the corresponding pressure-resistant water tank to less than pressure of a water source, and then a liquid injection valve is opened to inject the liquid fire extinguishing agent into the corresponding pressure-resistant water tank.

In step S5, after the corresponding pressure-resistant water tank is filled with the liquid fire extinguishing agent, the pressure relief valve and the liquid injection valve are closed and the intercommunicating valve on the corresponding gas inlet branch is opened to inject the high-pressure gaseous working medium, and then next spraying again is started.

In step S6, the first pressure-resistant water tank 4 and the second pressure-resistant water tank 5 are enabled to work alternately to form impulsive long-distance large-water liquid spraying.

The present disclosure can realize ultra-high, ultra-long-distance and pulsed continuous large-flow water jet, and has the advantages of low cost, high efficiency, high safety, high applicability, no pollution and the like. When the equipment enters a fire scene, spraying is started immediately to extinguish fires without much preparation.

The applicant has successfully developed an asynchronous enabling high-rise fire extinguishing model machine. The model machine is placed on the road near a burning high-rise building, a pulse water jet with a vertical height of more than 100 meters can be realized, and water can be sprayed to the roof with a height of 80 meters in the first field test. With the progress of technology, the water jet is higher, the water quantity is larger, the duration is longer, and the pulse period is shorter, so that the needs of higher-level fire extinguishing can be met.

Although the embodiments of the present disclosure have already been illustrated and described, various changes, modifications, replacements and transformations can be made by those skilled in the art under the condition of without departing from the principle and the spirit of the present disclosure, and thus the scope of the present disclosure should be restricted by claims and equivalents thereof.

What is claimed is:

1. A pulsed low-altitude and high-spray tank fire truck, comprising:

a liquid working medium storage tank for storing a liquid working medium and having a liquid outlet, an energy storage gas tank having a gas inlet and a gas outlet, a first pressure-resistant water tank, a second pressure-resistant water tank, a low-pressure water tank, a system control module, and a fire truck chassis for dynamic load bearing and for providing maneuverability of the pulsed low-altitude and high-spray tank fire truck, wherein the liquid working medium storage tank, the energy storage gas tank, the first pressure-resistant water tank, the second pressure-resistant water tank, the low-pressure water tank and the system control module are arranged on the fire truck chassis, wherein the liquid outlet of the liquid working medium storage tank is connected with the gas inlet of the energy storage gas tank through a phase change enabler, wherein the phase change enabler is configured to heat the liquid working medium output from the liquid working medium storage tank for being energized such that the liquid working medium changes from a liquid phase into a gas phase and to pressurize the gasified working medium and transfer the gasified working medium into the energy storage gas tank, wherein the gas outlet of the energy storage gas tank is connected to a gas inlet of the first pressure-resistant water tank and to a gas inlet of the second pressure-resistant water tank through two gas intake branches, wherein the energy storage gas tank is configured to provide a high-pressure gaseous working medium having a selected pressure for the first pressure-resistant water tank and the second pressure-resistant water tank filled with a liquid fire extinguishing agent, wherein a first electric control water cannon and a second electric control water cannon are respectively arranged on the first pressure-resistant water tank and the second pressure-resistant water tank, the first pressure-resistant water tank and the second pressure-resistant water tank are used for working alternately, the first electric control water cannon and the second electric control water cannon are respectively configured to spray a high-pressure liquid fire extinguishing agent formed in the first pressure-resistant water tank and the second pressure-resistant water tank to a position of a fire point at a specified height, and wherein the specified height is dependent on the selected pressure; and wherein the system control module is configured to realize automatic pressurization of the first pressure-resistant water tank and the second pressure-resistant water tank and automatic spray operation of the first electric control water cannon and the second electric control water cannon.

2. The pulsed low-altitude and high-spray tank fire truck according to claim 1, wherein the low-pressure water tank is connected with a water source through a water supply pipe, wherein the water source is one of a water wagon, a watering cart or a fire hydrant, wherein a water pump capable of generating a certain pressure is mounted on the water supply pipe, wherein two water outlets of the low-pressure water tank are respectively connected with water inlets of the first pressure-resistant water tank and the second pressure-resistant water tank through water injection branch pipes, and a first liquid injection valve and a second liquid injection valve are respectively mounted on the water injection branch pipes of the first pressure-resistant water tank and the second pressure-resistant water tank.

3. The pulsed low-altitude and high-spray tank fire truck according to claim 1, wherein a first pressure relief valve and a second pressure relief valve are respectively arranged on the first pressure-resistant water tank and the second pressure-resistant water tank.

4. The pulsed low-altitude and high-spray tank fire truck according to claim 1, wherein the energy storage gas tank, the first pressure-resistant water tank, the second pressure-resistant water tank and all pipelines are provided with one or more sensors or electric control valves, and the sensors and electric control valves are coupled to the system control module to realize automatic control of a system.

5. The pulsed low-altitude and high-spray tank fire truck according to claim 1, wherein the liquid fire extinguishing agent is water or fire extinguishing foam liquid.

6. The pulsed low-altitude and high-spray tank fire truck according to claim 1, wherein the working medium is carbon dioxide or nitrogen.

7. The pulsed low-altitude and high-spray tank fire truck according to claim 1, wherein the first electric control water cannon and the second electric control water cannon are both high-pressure fire cannons.

8. The pulsed low-altitude and high-spray tank fire truck according to claim 1, wherein the phase change enabler comprises a heat exchanger for gasifying the liquid working medium and a heater for providing heat for the heat exchanger; and the liquid outlet of the liquid working medium storage tank is connected with a liquid inlet of the heat exchanger through a liquid inlet pipe, and a gas outlet of the heat exchanger is connected with the gas inlet of the energy storage gas tank through an exhaust pipe.

9. A spray method of a pulsed low-altitude and high-spray tank fire truck, comprising following steps:

loading a liquid fire extinguishing agent into a low-pressure water tank, and filling a liquid fire extinguishing agent into a first pressure-resistant water tank and a second pressure-resistant water tank through the low-pressure water tank;

injecting a high-pressure gaseous working medium into an energy storage gas tank by using a phase change enabler;

opening intercommunicating valves on gas intake branches between the energy storage gas tank and the first pressure-resistant water tank and between the energy storage gas tank and the second pressure-resistant water tank, to apply pressure of the energy storage gas tank to liquid in the first pressure-resistant water tank and the second pressure-resistant water tank; and opening spray valves of a first electric control water cannon and a second electric control water cannon, to spray a high-pressure liquid extinguishing agent in the first pressure-resistant water tank and the second pressure-resistant water tank to a position of a fire point at a specified height;

when a spraying of the first pressure-resistant water tank or the second pressure-resistant water tank is nearly completed, closing a intercommunicating valve on a corresponding gas intake branch to reserve gas sealed in the energy storage gas tank for a next spraying;

when the spraying of the first pressure-resistant water tank or the second pressure-resistant water tank is completed, closing a corresponding spray valve and opening a pressure relief valve on a corresponding pressure-resistant water tank, to release residual gas in the corresponding pressure-resistant water tank and quickly reduce pressure in the corresponding pressure-resistant water tank to less than pressure of a water source, and opening a liquid injection valve to inject the liquid fire extinguishing agent into the corresponding pressure-resistant water tank;

after the corresponding pressure-resistant water tank is filled with the liquid fire extinguishing agent, closing the pressure relief valve and the liquid injection valve and opening the intercommunicating valve on the corresponding gas inlet branch to inject the high-pressure gaseous working medium, and then starting next spraying again; and enabling the first pressure-resistant water tank and the second pressure-resistant water tank to work alternately to form impulsive long-distance large-water liquid spraying.

* * * * *